US011945237B2

(12) United States Patent
Nakamura

(10) Patent No.: US 11,945,237 B2
(45) Date of Patent: Apr. 2, 2024

(54) INKJET RECORDING DEVICE

(71) Applicant: KYOCERA Document Solutions Inc., Osaka (JP)

(72) Inventor: Satoru Nakamura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 108 days.

(21) Appl. No.: 17/899,221

(22) Filed: Aug. 30, 2022

(65) Prior Publication Data

US 2023/0062349 A1 Mar. 2, 2023

(30) Foreign Application Priority Data

Aug. 31, 2021 (JP) ................................ 2021-141437

(51) Int. Cl.

| | |
|---|---|
| ***B41J 29/17*** | (2006.01) |
| ***B41J 29/12*** | (2006.01) |
| ***B41J 29/377*** | (2006.01) |
| ***B65H 54/70*** | (2006.01) |
| *B41J 11/00* | (2006.01) |
| *B41J 29/38* | (2006.01) |

(52) U.S. Cl.

CPC ............... *B41J 29/17* (2013.01); *B41J 29/12* (2013.01); *B41J 29/377* (2013.01); *B65H 54/702* (2013.01); *B41J 11/007* (2013.01); *B41J 11/0085* (2013.01); *B41J 29/38* (2013.01); *B65H 54/707* (2013.01); *B65H 2301/44322* (2013.01); *B65H 2301/44336* (2013.01)

(58) Field of Classification Search

CPC . B41J 29/17; B41J 29/12; B41J 29/377; B41J 11/007; B41J 11/0085; B41J 29/38; B65H 54/702; B65H 54/707; B65H 2301/44322; B65H 2301/44336

See application file for complete search history.

(56) References Cited

U.S. PATENT DOCUMENTS

2005/0122372 A1* 6/2005 Shimizu ................. B41J 11/007 347/22
2006/0023021 A1* 2/2006 Shimizu ............... B41J 11/0085 347/42
2012/0218347 A1 8/2012 Itogawa .......................... 347/34
2015/0309463 A1 10/2015 Masunari et al.
2016/0257142 A1* 9/2016 Soda ...................... B41J 29/377

FOREIGN PATENT DOCUMENTS

JP 2012-176846 A 9/2012
JP 2014-113746 A 6/2014

* cited by examiner

*Primary Examiner* — Henok D Legesse
(74) *Attorney, Agent, or Firm* — Stein IP, LLC

(57) ABSTRACT

An inkjet recording device includes a conveying unit, a recording unit, a device main body, and a control unit. The conveying unit includes an endless conveyor belt having many air holes for sucking air, and a sheet sucking unit. The sheet sucking unit is disposed inside a loop of the conveyor belt, and includes a fan for sucking air through the air holes and a fan drive motor. The recording unit includes a recording head disposed to face an outer circumference surface of the conveyor belt, so as to eject ink from ink ejection nozzles to the paper sheet sucked and held on the conveyor belt. The control unit executes a paper dust removing mode during image non-recording time, in which it rotates the fan drive motor by a power higher than that when conveying the paper sheet, so as to remove paper dust in the device main body.

8 Claims, 4 Drawing Sheets

INKJET RECORDING DEVICE

INCORPORATION BY REFERENCE

This application is based upon and claims the benefit of priority from the corresponding Japanese Patent Application No. 2021-141437 filed Aug. 31, 2021, the entire contents of which are hereby incorporated by reference.

BACKGROUND

The present disclosure relates to an inkjet recording device that ejects ink from ink ejection nozzles of a recording head so as to perform recording.

As a recording device such as a facsimile machine, a copier, or a printer, an inkjet recording device is widely used, which ejects ink from the nozzles of the recording head to form an image, so that a high definition image can be formed.

Such an inkjet recording device has a problem that paper dust generated from a paper sheet as a recording medium may clog the nozzle and cause a nozzle ejection failure (missing dot), resulting in lowering of image quality.

SUMMARY

An inkjet recording device according to an aspect of the present disclosure includes a conveying unit, a recording unit, a device main body, and a control unit. The conveying unit includes a conveyor belt and a sheet sucking unit, so as to convey a paper sheet. The conveyor belt is endless and has many air holes for sucking air. The sheet sucking unit is disposed inside a loop of the conveyor belt, and includes a fan for sucking air through the air holes and a fan drive motor for rotating the fan, so as to suck and hold the paper sheet on the conveyor belt. The recording unit includes a recording head disposed to face an outer circumference surface of the conveyor belt, so as to eject ink from ink ejection nozzles of the recording head to the paper sheet sucked and held on the conveyor belt. The device main body houses the conveying unit and the recording unit. The control unit controls the conveying unit and the recording unit. The control unit is capable of executing a paper dust removing mode during image non-recording time, in which it rotates the fan drive motor by a power higher than that when conveying the paper sheet, so as to remove paper dust in the device main body.

DETAILED DESCRIPTION

Figure 1:
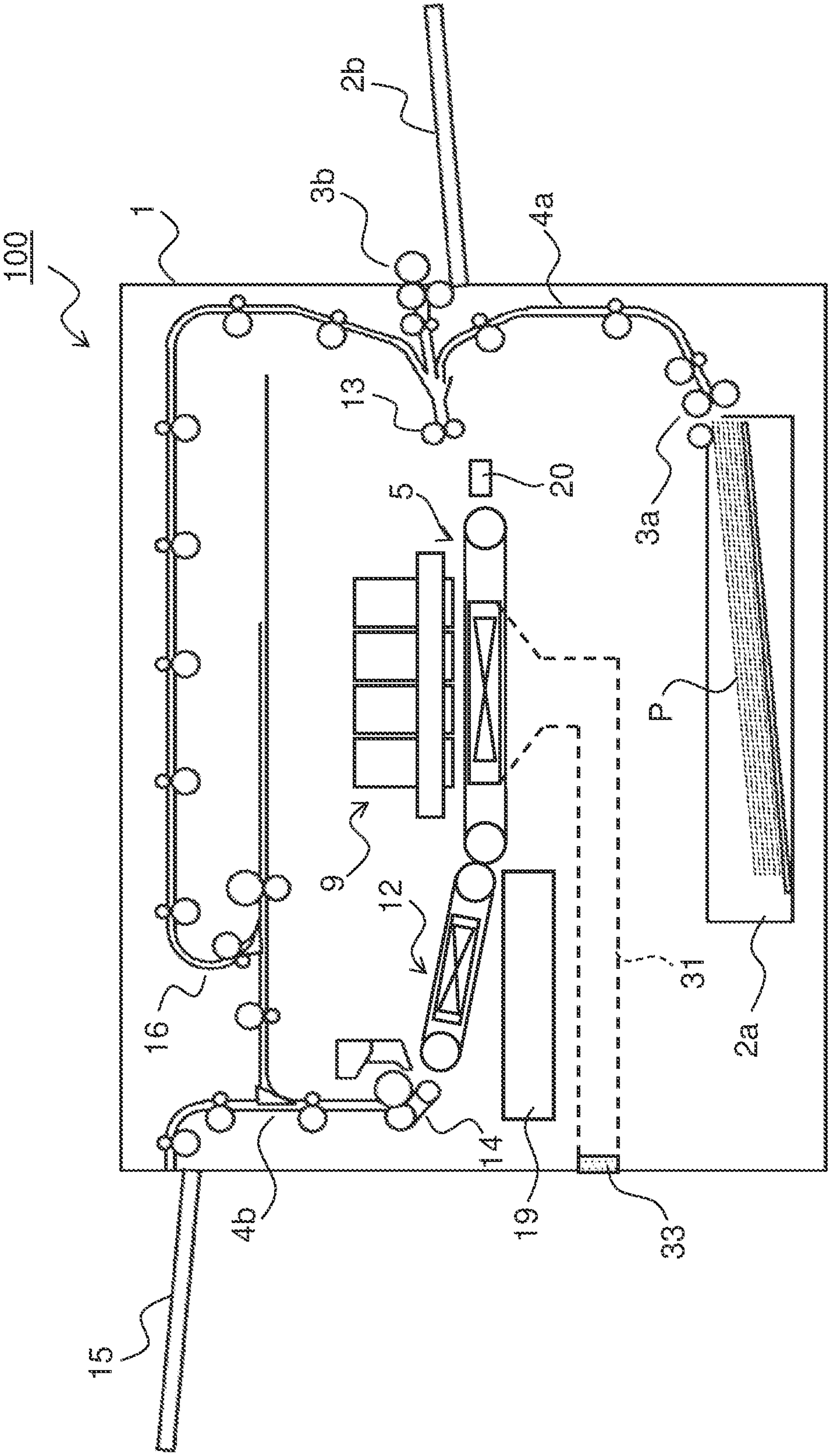
FIG. 1 is a cross-sectional side view illustrating a schematic structure of a printer according to an embodiment of the present disclosure.
Figure 2:
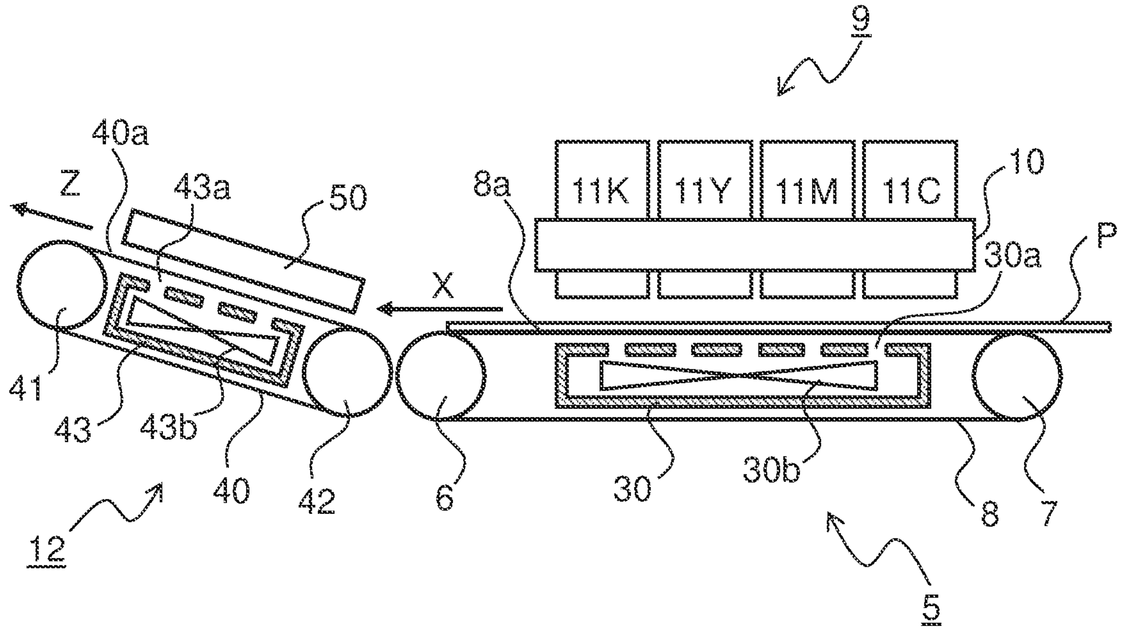
FIG. 2 is a cross-sectional side view illustrating a structure of a first belt conveying unit, a recording unit, a second belt conveying unit, and their vicinity of the printer according to this embodiment.
Figure 3:
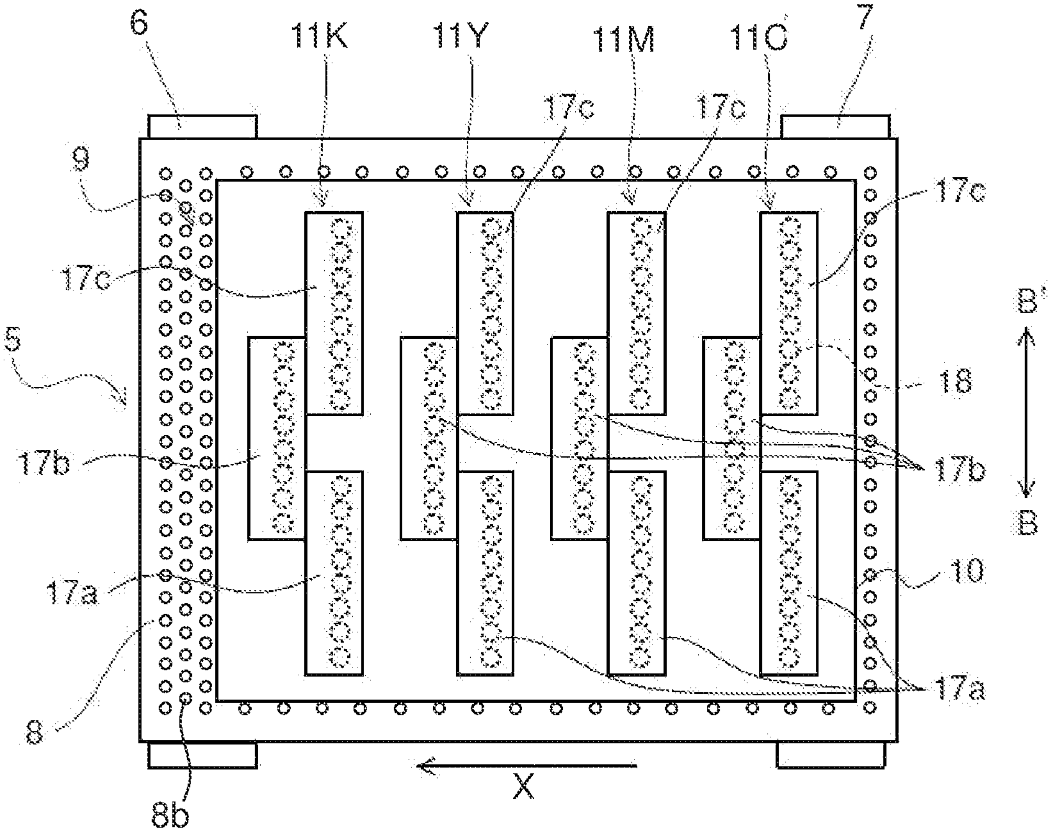
FIG. 3 is a plan view from above of a first belt conveying unit and a recording unit of the printer according to this embodiment.

Hereinafter, an embodiment of the present disclosure is described with reference to the drawings. FIG. 1 is a cross-sectional side view illustrating a schematic structure of a printer 100 of an inkjet recording method according to an embodiment of the present disclosure, FIG. 2 is a cross-sectional view illustrating a structure of a first belt conveying unit 5, a recording unit 9, a second belt conveying unit 12, and their vicinity of the printer 100 illustrated in FIG. 1, and FIG. 3 is a plan view from above of the first belt conveying unit 5 and the recording unit 9 of the printer 100 illustrated in FIG. 1.

As illustrated in FIG. 1, the printer 100 includes a sheet feed cassette 2*a* as a sheet housing unit disposed in a lower part of a printer main body 1. On the right outside of the printer main body 1, a manual sheet feeding tray 2*b* is disposed. A sheet feeding device 3*a* is disposed downstream of the sheet feed cassette 2*a* in a sheet conveying direction, i.e. on the upper right side of the sheet feed cassette 2*a* in FIG. 1. In addition, a sheet feeding device 3*b* is disposed downstream of the manual sheet feeding tray 2*b* in the sheet conveying direction, i.e. on the left side of the manual sheet feeding tray 2*b* in FIG. 1. The sheet feeding device 3*a*, 3*b* enables to separate and feed paper sheets (sheets) P one by one.

In addition, a first sheet conveying path 4*a* is formed inside the printer 100. The first sheet conveying path 4*a* is positioned on the upper right side of the sheet feed cassette 2*a*. i.e. on the left side of the manual sheet feeding tray 2*b*. The paper sheet P sent out from the sheet feed cassette 2*a* passes through the first sheet conveying path 4*a* and is conveyed vertically upward along the side of the printer main body 1. The paper sheet sent out from the manual sheet feeding tray 2*b* passes through the first sheet conveying path 4*a* and is conveyed substantially horizontally to the left.

A registration roller pair 13 is disposed at a downstream end of the first sheet conveying path 4*a* in the sheet conveying direction. Further, the first belt conveying unit (conveying unit) 5 and the recording unit 9 are disposed near the registration roller pair 13 on the downstream side. The registration roller pair 13 corrects a skew of the paper sheet P, and sends out the paper sheet P to the first belt conveying unit 5 in synchronization with an ink ejection operation by the recording unit 9.

In addition, between the registration roller pair 13 and the first belt conveying unit 5, there is disposed a contact image sensor (CIS) 20 as a sheet detection sensor for detecting an end position of the paper sheet P in a width direction (in a direction perpendicular to the sheet conveying direction).

The first belt conveying unit 5 includes an endless first conveyor belt 8 (see FIG. 2) stretched around a first drive roller 6 and a first driven roller 7. The paper sheet P sent out from the registration roller pair 13 passes below the recording unit 9, in the state where it is sucked and held on a carrying surface 8*a* of the first conveyor belt 8.

A first sheet sucking unit 30 is disposed at a position facing a backside of the carrying surface 8*a* of the first conveyor belt 8, inside the loop of the first conveyor belt 8. The first sheet sucking unit 30 has many holes 30*a* formed in the upper surface for sucking air. A first fan 30*b* is disposed inside the first sheet sucking unit 30, and it can suck air downward through the upper surface. In addition, the first conveyor belt 8 also has many air holes 8*b* for sucking air (see FIG. 3). With the structure described above, the first belt conveying unit 5 conveys the paper sheet P while sucking and holding the same on the carrying surface 8*a* of the first conveyor belt 8. The first sheet sucking unit 30 is connected to an exhaust duct 31 (see FIG. 1). The exhaust duct 31 discharges the air sucked by the first sheet sucking unit 30 to outside of the printer main body 1. A dust collecting filter 33 is disposed at a downstream end of the exhaust duct 31 in the air flow direction in the exhaust duct 31. The dust collecting filter 33 collects foreign objects such as paper dust contained in the air passing through the exhaust duct 31.

As illustrated in FIG. 3, the recording unit 9 includes a head housing 10 and line heads 11C, 11M, 11Y, and 11K held by the head housing 10. Each of the line heads 11C to 11K has a recording area of width larger than that of the paper sheet P, and is supported at a height to form a predetermined gap (e.g. 1 mm) between itself and the carrying surface 8*a* of the first conveyor belt 8.

Each of the line heads 11C to 11K includes three recording heads 17*a* to 17*c* arranged in a zigzag manner, in the sheet width direction (the up and down direction in FIG. 3) perpendicular to the sheet conveying direction. Many ink ejection nozzles 18 are arranged in an ink ejection surface of each of the recording heads 17*a* to 17*c*.

The recording heads 17*a* to 17*c* constituting each of the line heads 11C to 11K are supplied with ink of the corresponding color among four colors inks (cyan, magenta, yellow, and black color inks), which are respectively stored in ink tanks (not shown).

Each of the recording heads 17*a* to 17*c* can eject ink through the ink ejection nozzles 18 corresponding to print positions in accordance with image data received from an external computer or the like, to the paper sheet P conveyed while sucked and held on the carrying surface 8*a* of the first conveyor belt 8. In this way, the cyan, magenta, yellow, and black color inks are superimposed so that a color image is formed on the paper sheet P on the first conveyor belt 8. Note that the printer 100 can also record a monochrome image.

On the downstream side (the left side in FIG. 1) of the first belt conveying unit 5 in the sheet conveying direction, there is disposed the second belt conveying unit 12. The paper sheet P with the image recorded in the recording unit 9 is sent to the second belt conveying unit 12, and passes through the second belt conveying unit 12 while the inks on the surface of the paper sheet P are dried.

The second belt conveying unit 12 includes an endless second conveyor belt 40 stretched around a second drive roller 41 and a second driven roller 42. The second conveyor belt 40 is driven by the second drive roller 41 to turn in a counterclockwise direction in FIG. 2. The paper sheet P with the image recorded in the recording unit 9 is conveyed by the first belt conveying unit 5 in an arrow X direction, transferred to the second conveyor belt 40, and is conveyed in an arrow Z direction in FIG. 2.

A second sheet sucking unit 43 is disposed at a position facing a backside of a carrying surface 40*a* of the second conveyor belt 40, inside the loop of the second conveyor belt 40. The second sheet sucking unit 43 has many holes 43*a* formed in the upper surface for sucking air. A second fan 43*b* is disposed inside the second sheet sucking unit 43, and it can suck air downward through the upper surface. In addition, the second conveyor belt 40 also has many air holes for sucking air (not shown). With the structure described above, the second belt conveying unit 12 conveys the paper sheet P while sucking and holding the same on the carrying surface 40*a* of the second conveyor belt 40. Note that although not shown here, the second sheet sucking unit 43 is also connected to the exhaust duct 31, so the air sucked by the second sheet sucking unit 43 passes through the exhaust duct 31 and the dust collecting filter 33, and is discharged to outside of the printer main body 1.

In addition, a conveyance guide part 50 is disposed at a position facing the carrying surface 40*a* of the second conveyor belt 40. The conveyance guide part 50 and the carrying surface 40*a* of the second conveyor belt 40 constitutes a sheet conveyance path together with the carrying surface 40*a* of the second conveyor belt 40. The conveyance guide part 50 suppresses warping or fluttering of the paper sheet P sucked and held on the carrying surface 40*a* by the second sheet sucking unit 43.

A decurler unit 14 is disposed downstream of the second belt conveying unit 12 in the sheet conveying direction and in a vicinity of the left side of the printer main body 1. The paper sheet P after the inks are dried in the second belt conveying unit 12 is sent to the decurler unit 14, which corrects a curl of the paper sheet P.

On the downstream side (the upper side in FIG. 1) of the decurler unit 14 in the sheet conveying direction, there is disposed a second sheet conveying path 4*b*. When double-sided recording is not performed, the paper sheet P after passing through the decurler unit 14 is discharged onto a paper sheet discharge tray 15 disposed on the left outside of the printer 100, from the second sheet conveying path 4*b* via a discharge roller pair. When the double-sided recording is performed on the paper sheet P, the paper sheet P, after recording on one side and passing through the second belt conveying unit 12 and the decurler unit 14, passes through the second sheet conveying path 4*b* and is conveyed to a reverse conveying path 16. The paper sheet P sent to the reverse conveying path 16 is changed in the conveying direction so as to be upside down, passes through the upper part of the printer 100, and is conveyed to the registration roller pair 13. After that, the paper sheet P is conveyed to the first belt conveying unit 5 again, in the state where the side with no image recorded faces upward.

In addition, a maintenance unit 19 is disposed below the second belt conveying unit 12. When performing maintenance of the recording heads 17*a* to 17*c*, the maintenance unit 19 moves to below the recording unit 9, wipes ink pushed out (purged) from the ink ejection nozzles 18 of the recording heads 17*a* to 17*c* (see FIG. 3), and collects the wiped ink.

Figure 4:
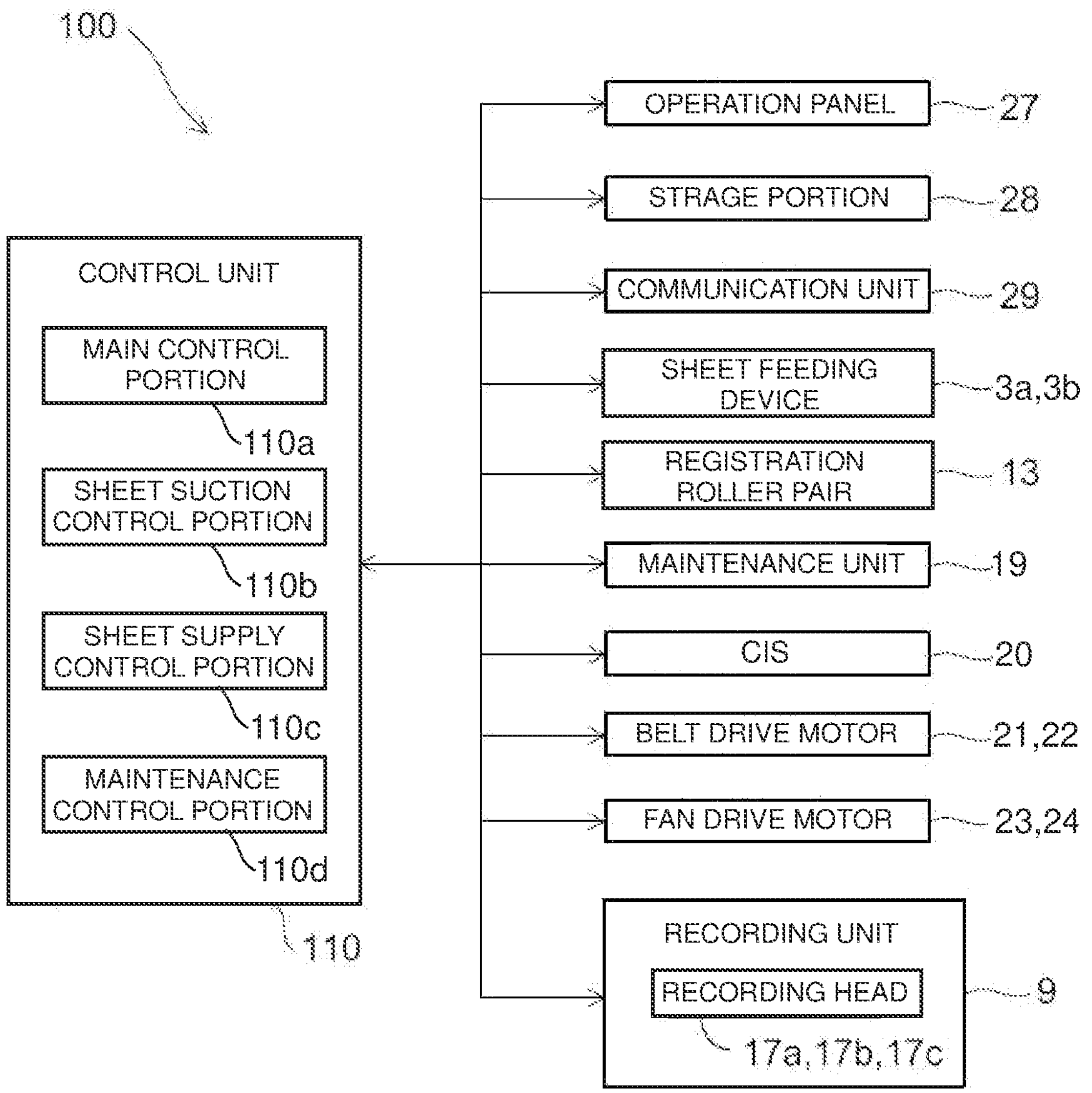
FIG. 4 is a block diagram illustrating an example of a control path of the printer according to this embodiment.

FIG. 4 is a block diagram illustrating an example of a control path of the printer 100 according to this embodiment. The printer 100 further includes, in addition to the structure described above, belt drive motors 21 and 22, fan drive motors 23 and 24, an operation panel 27, a storage unit 28, and a communication unit 29.

The belt drive motors 21 and 22 respectively drive the first drive roller 6 and the second drive roller 41 to rotate, so that the first conveyor belt 8 and the second conveyor belt 40 can turn. The fan drive motors 23 and 24 respectively drive the first fan 30*b* of the first sheet sucking unit 30 and the second fan 43*b* of the second sheet sucking unit 43 to rotate.

The operation panel 27 is an operation unit for receiving various setting inputs. For instance, by operating the operation panel 27, a user can input a size of the paper sheets P set in the sheet feed cassette 2*a*, i.e. information of a size of the paper sheet P that is conveyed by the first conveyor belt 8. In addition, by operating the operation panel 27, the user can also input the number of the paper sheets P to be printed or instruct start of a print job. In addition, the operation panel 27 also has a function as a notification device for notifying about an operating state (image recording mode or a paper dust removing mode described later) of the printer 100.

The storage unit 28 is a memory for storing an operation program of a control unit 110 and various sets of information, and it includes a read only memory (ROM), a random access memory (RAM), a nonvolatile memory, and the like. The information set by the operation panel 27 is stored in the storage unit 28.

The communication unit 29 is a communication interface for communicating information with an external device (such as a personal computer (PC)). For instance, when the user operates the PC and sends a print command with image data to the printer 100, the image data and the print command are input to the printer 100 via the communication unit 29. In the printer 100, a main control portion 110*a* controls the recording heads 17*a* to 17*c* to eject ink on the basis of the image data, so that an image can be recorded on the paper sheet P.

In addition, the printer 100 according to this embodiment includes the control unit 110. The control unit 110 is constituted of a central processing unit (CPU) and a memory, for example. Specifically, the control unit 110 includes the main control portion 110*a*, a sheet suction control portion 110*b*, a sheet supply control portion 110*c*, and a maintenance control portion 110*d*.

The main control portion 110*a* controls operations of individual units in the printer 100. For instance, drive of each roller in the printer 100, ink ejection from the recording heads 17*a* to 17*c* when recording an image, and the like are controlled by the main control portion 110*a*. The sheet suction control portion 110*b* sends a control signal to the fan drive motors 23 and 24 so as to control rotations of the first fan 30*b* and the second fan 43*b*, and thus a state of the paper sheet P sucked and held on the first conveyor belt 8 or the second conveyor belt 40 can be controlled. In addition, the sheet suction control portion 110*b* controls rotations of the first fan 30*b* and the second fan 43*b*, so as to perform the paper dust removing mode described later.

The sheet supply control portion 110*c* is a recording medium supply control portion that controls the registration roller pair 13 as a recording medium supply unit. For instance, the sheet supply control portion 110*c* controls the registration roller pair 13 based on a detection timing of a rear end of the paper sheet P by the CIS 20, and thus controls a conveyance timing of the following paper sheet P.

The maintenance control portion 110*d* controls the recording heads 17*a* to 17*c* to perform the purge operation described above in which the ink ejection nozzles 18 push out ink in a forced manner. When the maintenance control portion 10*d* controls the recording heads 17*a* to 17*c* to perform the purge operation, it also controls drive of the maintenance unit 19 described above (e.g. movement to below the recording unit 9 and retraction).

Note that the control unit 110 may further include a calculation portion that performs necessary calculation, and a time measuring portion that measures time. In addition, the main control portion 110*a* may also works as the calculation portion or the time measuring portion described above.

As described above, there is a problem that paper dust generated from the paper sheet P may clog the ink ejection nozzle 18 and cause an ink ejection failure (missing dot) of the ink ejection nozzles 18, resulting in lowering of image quality. Therefore, the printer 100 according to this embodiment performs the paper dust removing mode during image non-recording time, in which the first sheet sucking unit 30 and the second sheet sucking unit 43 are used for sucking paper dust floating in the printer main body 1.

In the paper dust removing mode, the fan drive motors 23 and 24 are driven to rotate by a power higher than that when conveying (sucking) the paper sheet P. For instance, when the power of the fan drive motor 23, 24 is expressed by a duty ratio, the duty ratio of the fan drive motor 23, 24 when conveying the paper sheet P is 50% to 70%, while the duty ratio of the fan drive motors 23 and 24 in the paper dust removing mode is 100% (maximum power).

As a result, the first fan 30*b* and the second fan 43*b* also rotate at a rotation speed higher than that when conveying the paper sheet P, and paper dust floating in the printer main body 1 is sucked by the first sheet sucking unit 30 and the second sheet sucking unit 43. The sucked paper dust passes through the exhaust duct 31 with air flow and is collected by the dust collecting filter 33.

By executing the paper dust removing mode, paper dust floating in the printer main body 1 can be reduced, and clogging of the ink ejection nozzles 18 due to paper dust can be suppressed. In addition, as the paper dust removing mode is performed while turning the first conveyor belt 8 and the second conveyor belt 40, paper dust adhered to perimeters of the first conveyor belt 8 and the second conveyor belt 40 can be sucked and removed, which is preferred.

Execution timing of the paper dust removing mode may be when image recording is finished, when the printer 100 is powered on or returned from a power saving (sleep) mode, when performing restoring operation (purge operation) of the recording heads 17*a* to 17*c* in which the ink ejection nozzles 18 push out thickened ink, or other timing.

Note that if the paper dust removing mode is performed every time when image recording is finished, an execution interval (interval) of the paper dust removing mode is shortened while print waiting time is increased, and hence image forming efficiency (productivity) is lowered. Therefore, the number of printed sheets (or printing time) is counted and accumulated, and the paper dust removing mode is performed every time when the number of printed sheets (or printing time) reaches a predetermined value. Thus, paper dust floating in the printer main body 1 can be reduced while suppressing the decrease in the image forming efficiency (productivity).

Duration time of the paper dust removing mode can be appropriately set in accordance with internal volume of the printer main body 1, execution timing of the paper dust removing mode, suction powers of the first sheet sucking unit 30 and the second sheet sucking unit 43 (maximum powers of the fan drive motors 23 and 24), and the like, and the duration time is preferably 30 seconds approximately. In addition, when executing the paper dust removing mode during the purge operation, the duration time is preferably shorter than time necessary for the purge operation, in order to decrease the print waiting time as much as possible.

Figure 5:
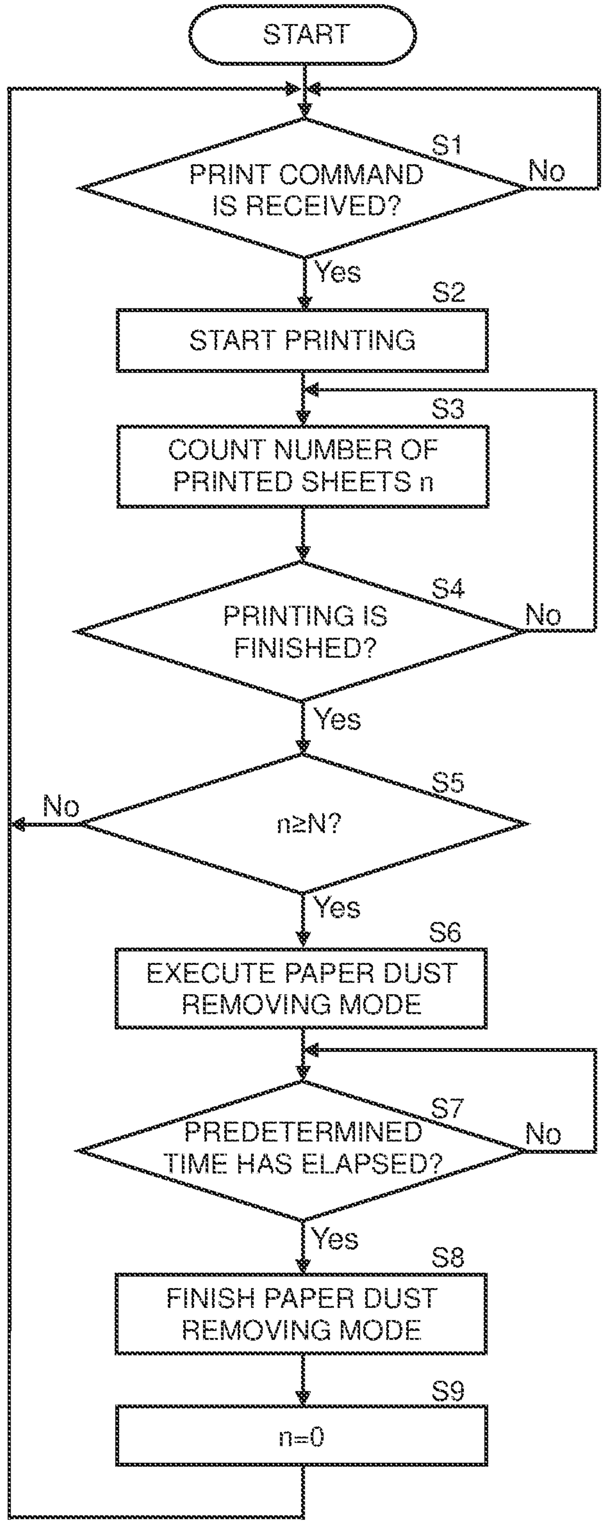
FIG. 5 is a flowchart of a control example of a paper dust removing mode executed in the printer according to this embodiment.

FIG. 5 is a flowchart illustrating a control example of the paper dust removing mode that is executed in the printer 100 according to this embodiment. With reference to FIGS. 1 to 4 as necessary, along with steps in FIG. 5, execution procedure of the paper dust removing mode by the printer 100 is described.

The main control portion 110*a* determines whether or not a print command is received via the communication unit 29 from a host device such as a personal computer (Step S1). If the print command is not received (No in Step S1), a print waiting state is continued. If the print command is received (Yes in Step S1), the main control portion 110*a* starts printing on the paper sheet P (Step S2).

Specifically, the sheet supply control portion 110*c* controls the sheet feeding device 3*a* and the registration roller pair 13 to supply the paper sheet P to the first conveyor belt 8, and the sheet suction control portion 110*b* controls the first sheet sucking unit 30 to suck and hold the paper sheet P on the first conveyor belt 8. The main control portion 10*a* controls the recording heads 17*a* to 17*c* to eject ink to the paper sheet P in accordance with image data input via the communication unit 29. In addition, the main control portion 110*a* counts and accumulates the number of printed sheets n (Step S3).

Next, the main control portion 110*a* determines whether or not the printing is finished (Step S4). If the printing is not finished (No in Step S4), the process flow returns to Step S3, and the main control portion 110*a* continues ejecting ink to the paper sheet P and counting the number of printed sheets n. If the printing is finished (Yes in Step S4), the main control portion 110*a* determines whether or not the number of printed sheets n is a predetermined value N (such as 100) or larger (Step S5). If $n<N$ is satisfied (No in Step S5), the process flow returns to Step S1, and the print waiting state is continued.

If $n \geq N$ is satisfied (Yes in Step S5), the paper dust removing mode is executed (Step S6). Specifically, the sheet suction control portion 110*b* sends a control signal to the belt drive motors 21 and 22, so that the first conveyor belt 8 and the second conveyor belt 40 can turn. In this state, the sheet suction control portion 110*b* sends a control signal to the fan drive motors 23 and 24, so as to drive the fan drive motors 23 and 24 to rotate by a power (such as the maximum power) higher than that when conveying (sucking) the paper sheet P. As a result, the first fan 30*b* and the second fan 43*b* also rotate at the maximum rotation speed, and paper dust floating in the printer main body 1 is sucked by the first sheet sucking unit 30 and the second sheet sucking unit 43.

Next, the main control portion 110*a* determines whether or not a predetermined time (e.g. 30 seconds) has elapsed from start of the paper dust removing mode (Step S7). If the predetermined time has not elapsed (No in Step S7), the paper dust removing mode is continued. If the predetermined time has elapsed (Yes in Step S7), turnings of the first conveyor belt 8 and the second conveyor belt 40, and rotations of the first fan 30*b* and the second fan 43*b* are stopped, and the paper dust removing mode is finished (Step S8). Then, after resetting the number of printed sheets n ($n=0$) (Step S9), the process flow returned to Step S1, and the print waiting state is continued.

According to the control example illustrated in FIG. 5, the paper dust removing mode is executed every time when the number of printed sheets n reaches the predetermined value N. Therefore, paper dust floating in the printer main body 1 can be reduced while preventing image forming efficiency (productivity) from being lowered. As a result, it is possible to effectively suppress clogging of the ink ejection nozzle 18 due to paper dust.

Note that in FIG. 5, the paper dust removing mode is executed when the number of printed sheets n reaches the predetermined value N, but it may be possible to measure (count) and accumulate printing time t, and to execute the paper dust removing mode when the printing time t reaches a predetermined time T.

In addition, in FIG. 5, the paper dust removing mode is executed while turning the first conveyor belt 8 and the second conveyor belt 40, but it may be possible to execute the paper dust removing mode while stopping at least one of the first conveyor belt 8 and the second conveyor belt 40.

Other than that, without limiting to the embodiment described above, the present disclosure can be variously modified within the scope the present disclosure without deviating from the spirit thereof. For instance, the number of the ink ejection nozzles 18 of the recording heads 17*a* to 17*c*, a space between the nozzles, and the like can be appropriately set in accordance with specification of the printer 100. In addition, the number of the recording heads is also not limited particularly. For instance, one, two, or four or more recording heads may be disposed for each of the line heads 11C to 11K.

In addition, the above embodiment describes the line head type printer 100 as the inkjet recording device, which performs recording with the line heads 11C to 11K, each of which includes the recording heads 17*a* to 17*c* having the many ink ejection nozzles 18 arranged in the sheet width direction, but the present disclosure can be similarly applied to a serial type inkjet recording device that performs recording with a recording head 17 that moves over the sheet.

The present disclosure can be used for inkjet recording devices that perform recording by ejecting ink from the ink ejection nozzles of the recording head. Using the present disclosure, it is possible to provide the inkjet recording device that can effectively remove paper dust generated from the paper sheet, with a simple structure.

What is claimed is:

1. An inkjet recording device comprising:

a conveying unit to convey a paper sheet, including an endless conveyor belt with many air holes for sucking air, and a sheet sucking unit disposed inside a loop of the conveyor belt, the sheet sucking unit having a fan for sucking air through the air holes and a fan drive motor for rotating the fan so as to suck and hold the paper sheet on the conveyor belt;

a recording unit including a recording head disposed to face an outer circumference surface of the conveyor belt, so as to eject ink to the paper sheet sucked and held on the conveyor belt, from ink ejection nozzles of the recording head;

a device main body accommodating the conveying unit and the recording unit; and a control unit for controlling the conveying unit and the recording unit, wherein the control unit executes a paper dust removing mode during image non-recording time, so as to remove paper dust in the device main body by rotating the fan drive motor by a power higher than that when conveying the paper sheet.

2. The inkjet recording device according to claim 1, wherein the control unit executes the paper dust removing mode while turning the conveyor belt.

3. The inkjet recording device according to claim 1, wherein the control unit executes the paper dust removing mode by rotating the fan drive motor by maximum power.

4. The inkjet recording device according to claim 1, wherein the control unit executes the paper dust removing mode every time when an accumulated value of the number of printed sheets or an accumulated value of printing time from the last execution of the paper dust removing mode reaches a predetermined value.

5. The inkjet recording device according to claim 1, wherein the control unit executes the paper dust removing mode when the device main body is powered on or returned from a power saving mode.

6. The inkjet recording device according to claim 1, further comprising:

a maintenance unit arranged to perform a restoring operation of the recording head for wiping ink pushed out from the ink ejection nozzles and collecting the wiped ink, wherein the control unit executes the paper dust removing mode when performing the restoring operation of the recording head.

7. The inkjet recording device according to claim 6, wherein execution time of the paper dust removing mode is shorter than time necessary for performing the restoring operation of the recording head.

8. The inkjet recording device according to claim 1, further comprising:

an exhaust duct for discharging the air sucked by the sheet sucking unit to outside of the device main body; and a dust collecting filter for collecting paper dust contained in the air passing through the exhaust duct.

* * * * *